United States Patent [19]
Proulx et al.

[11] 4,340,328
[45] Jul. 20, 1982

[54] ROTARY CUTTING TOOL AND TOOL DRIVER

[75] Inventors: Sylvester E. Proulx; Stanley A. Beneteau, both of Windsor, Canada

[73] Assignee: J. P. Tool, Ltd., Windsor, Canada

[21] Appl. No.: 175,290

[22] Filed: Aug. 4, 1980

Related U.S. Application Data

[63] Continuation of Ser. No. 28,725, Apr. 9, 1979, abandoned.

[30] Foreign Application Priority Data

Mar. 16, 1979 [CA] Canada ................................. 323670

[51] Int. Cl.³ ...................... B23B 31/10; B23B 31/44; B23B 5/22
[52] U.S. Cl. .................... 408/239 A; 408/226; 279/9 R; 279/90
[58] Field of Search .................. 408/239, 239 A, 238, 408/226; 279/1 B, 9 R, 6, 19.33, 90

[56] References Cited

U.S. PATENT DOCUMENTS

| | | | |
|---|---|---|---|
| 541,130 | 6/1895 | Swan . | |
| 1,474,404 | 11/1923 | Church | 279/90 |
| 1,474,404 | 11/1923 | Church . | |
| 1,522,125 | 1/1925 | Holmes . | |
| 1,915,669 | 6/1933 | Howard | 408/226 |
| 1,964,030 | 6/1934 | Brush | 408/226 |
| 1,965,917 | 7/1934 | Anderholm . | |
| 2,424,113 | 7/1947 | Norberg et al. | 408/226 |
| 2,533,179 | 12/1950 | Rodinger . | |
| 2,641,478 | 6/1953 | Sigg | 279/9 R |
| 3,353,437 | 11/1967 | Fischer | 408/226 |
| 3,531,810 | 10/1970 | Fure . | |
| 4,006,996 | 2/1977 | Kasabian | 408/226 |
| 4,167,363 | 9/1979 | Whitesel | 408/226 |

FOREIGN PATENT DOCUMENTS

| | | |
|---|---|---|
| 319308 | 3/1920 | Fed. Rep. of Germany . |
| 879191 | 6/1953 | Fed. Rep. of Germany . |
| 1904862 | 9/1969 | Fed. Rep. of Germany . |
| 1200029 | 6/1959 | France . |
| 45652 | 5/1966 | German Democratic Rep. . |
| 404735 | 1/1934 | United Kingdom . |
| 425706 | 3/1935 | United Kingdom . |
| 719625 | 12/1954 | United Kingdom . |

*Primary Examiner*—Harrison L. Hinson
*Attorney, Agent, or Firm*—Neuman, Williams, Anderson & Olson

[57] ABSTRACT

A tool driver for rotary cutting tools, such as reamers and drill bits, is described, along with rotary cutting tools of a novel design. The driver comprises a shank member having a cylindrical portion projecting axially from one end thereof and this cylindrical portion has at least two spline members projecting longitudinally from the end thereof remote from the shank. These spline members have curvilinear outer faces forming extensions of the cylindrical portion and also project inwardly to provide a central axial gap and radial gaps therebetween. A cylindrical sleeve member is rotatably mounted on the cylindrical portion and splines and this sleeve member has at the outer ends thereof radially inwardly projecting tab members which are adapted to engage notches in peripheral lands between the flutes of straight flute cutting tools when mounted in the driver.

45 Claims, 27 Drawing Figures

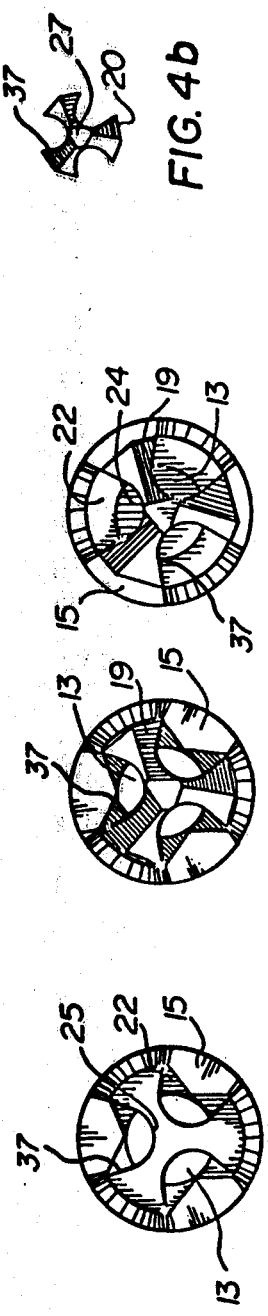

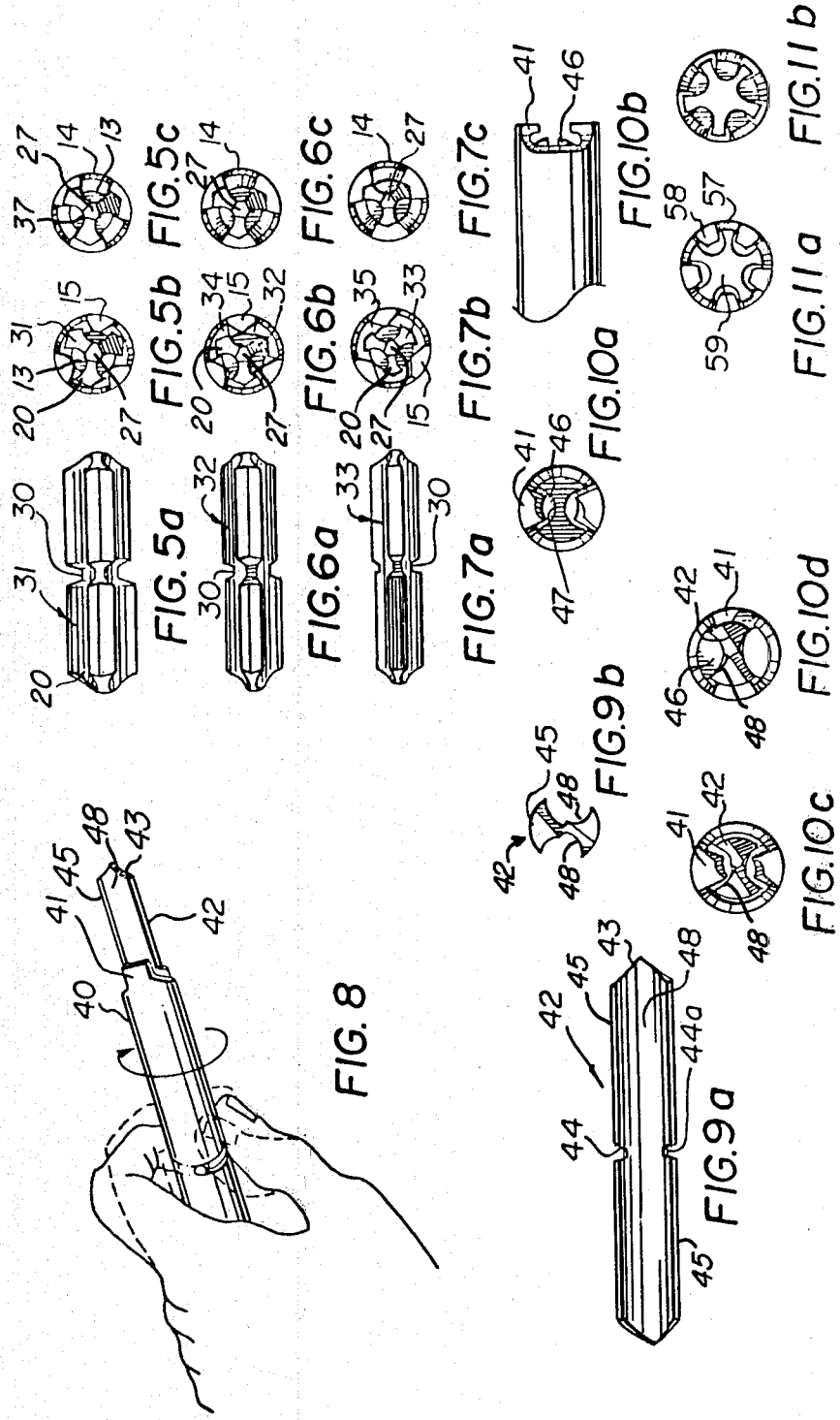

ROTARY CUTTING TOOL AND TOOL DRIVER

BACKGROUND OF THE INVENTION

This is a continuation of copending application Ser. No. 028,725 filed Apr. 9, 1979, now abandoned.

FIELD OF THE INVENTION

This invention relates to a rotary cutting tool driver and, more particularly, to a tool driver for straight fluted cutting tools such as reamers and drill bits, as well as to novel straight fluted cutting tools adapted for use with the driver.

DESCRIPTION OF THE PRIOR ART

A wide variety of rotary cutting tools are known such as twist drills, reamers, end mills, thread cutting taps, etc. having shanks of various configurations for mounting in the chuck of a drill press or milling machine. The usual chuch has a threaded sleeve member moving over tapered surfaces which contract around the shank to hold it tightly in position. The torque load between the chuck and the shank of the cutting tool is then borne fully by the metal-to-metal pressure between the two faces.

Other cutting tools of this type are held within a chuck by means of set screws which engage notches or recesses in the cutting tool shank.

Cutting tools of this type are widely used in metals manufacturing industries, particularly the automotive industry. In such service they are subjected to very intensive use and quickly become dull. Thus, they are changed frequently so that sharp cutting edges will always be in use.

There is, therefore, a need for a system which will permit a very simple and positive means for removing dull cutters and inserting sharp cutters without the need of special tools, etc. It is particularly desirable to have a system which can be manually locked and unlocked without the need of any separate tools.

It is, therefore, the object of the present invention to provide a new design of driver for rotary cutting tools which is manually adjustable from unlocked to locked position for inserting and removing cutting tools.

SUMMARY OF THE INVENTION

One feature of this invention is a rotary tool driver comprising a shank member having a cylindrical portion projecting axially from one end thereof, this cylindrical portion having at least two spline members projecting longitudinally from the end thereof remote from the shank. These spline members have curvilinear outer faces forming extensions of the cylindrical portion, project inwardly to provide a central axial gap and radial gaps between the spline members. A cylindrical sleeve member is rotatably mounted on the cylindrical portion and splines. The sleeve member has at the outer end thereof radially inwardly projecting tab members adapted to engage notches formed in peripheral lands between the flutes of a fluted cutting tool when the tool is mounted in the driver and the flutes engage the splines.

The cylindrical sleeve is fixed against axial movement and the tabs serve to hold the cutting tool within the driver by engaging the notches formed in the peripheral lands between the flutes of the cutting tool. The sleeve member includes a locking mechanism which retains the sleeve member in the locked (tool securing) position unless forcibly turned to the unlocked (tool releasing) position, preferably manually.

Another feature of the invention is the cutting tool or bit itself and this is in the form of a straight fluted cutting tool having two or more flutes with notches projecting radially inwardly into the faces of the peripheral lands between the flutes adapted for engagement with the tabs of the driver. According to a preferred embodiment, the novel bits or cutters have cutting edges at both ends so that when one end becomes dulled, it is a simple matter of manually removing the cutter and reversing it to expose the sharp end. When both ends have become dulled, they can be sharpened for re-use.

According to a particularly preferred embodiment of the invention, the spline members have at the outer ends thereof longitudinal projections with curvilinear outer faces radially inwardly offset from the spline outer faces. These projections are radially aligned with the sleeve end tabs and the outer faces thereof preferably have a diameter which corresponds to the diameter of the bottoms of the notches in the peripheral lands of the cutting tool. In this manner, the bottoms of the notches in the peripheral lands and the outer faces of the projections form a complete circle. The inner edges of the tab members then travel along this circular path.

When the cutting tool is inserted into the tool driver of this invention, the inner end of the cutting tool abuts against the end of the cylindrical portion adjacent the start of the spline members. In this manner, the full axial load is carried by the cylindrical portion and none of the axial load need be carried by the tab members of the sleeve. The torque load on the cutting tools is carried by face-to-face contact between the inwardly projecting faces of the spline members and the faces of the flutes of the cutting tool. It has been found particularly desirable to have the inner face of each spline shaped to locate and conformably engage the flutes of the cutting tool so that the cutting tool is snuggly held within the driver without any substantial lateral movement.

Another advantage of this arrangement is that cutting tools of differing cutting diameters can be inserted into a common driver without any need to adjust the driver itself. Thus, the cutting tools can all be produced with a common central root or web dimension and a common dimension for the inner portions of the flutes. The only variable is then the actual radially outward projections of the peripheral lands between the flutes. Thus, the outer faces of the lands do not actually engage the inner face of the cylindrical sleeve and the cutting tools are held by the contact between the central root portion and flute inner portions of the cutting tools with the inner faces of the splines. Thus, the driver has unique features both as a driver and as a holder for the cutting tools.

The cylindrical portion of the driver can also be provided with an axially adjustable central abutment for engaging the ends of cutting tools of different lengths. Thus, when cutting tools have been sharpened and their length thereby shortened, the abutment can be adjusted so that the axial load is still fully carried by the cylindrical portion of the driver, while the sleeve tabs still engage the notches in the lands of the cutting tools without carrying any axial load.

The device of this invention can be used with any kind of cutting tool having two or more flutes and is typically used with cutting tools having from two to six flutes. Although it is particularly advantageous to utilize cutting tools with cutting faces on both ends, it will be appreciated that the invention is equally adapted to cutting tools having cutting faces at only one end.

In the drawings which illustrate the invention:

FIG. 1 is an exploded view of a straight fluted reamer and driver;

FIG. 2 is a partial sectional view of the driver shown in FIG. 1;

FIG. 3a is an end elevation of the driver shown in FIG. 2 in position to receive a cutting tool;

FIG. 3b is the same view as FIG. 3a with a cutting tool inserted;

FIG. 3c is the same view as FIG. 3b but with the cutting tool locked into operational position;

FIG. 4a is a side elevation of a straight fluted reamer;

FIG. 4b is an end elevation of the reamer shown in FIG. 4a;

FIGS. 5a, 5b and 5c show a side elevation of a large reamer, an end elevation of the reamer inserted in a driver in unlocked position and the reamer inserted in a driver in the locked position respectively;

FIGS. 6a, 6b and 6c show a medium size reamer, an end elevation of the reamer in a holder in unlocked position and an end elevation of the reamer in a holder in locked position respectively;

FIGS. 7a, 7b and 7c show a side elevation of a small reamer, an end elevation of the reamer in a driver in unlocked position and the reamer in a driver in locked position respectively;

FIG. 8 is a perspective view of a straight fluted drill bit mounted in a driver according to the invention;

FIG. 9a is a side elevation of a two flute drill;

FIG. 9b is an end elevation of the drill shown in FIG. 9a;

FIG. 10a is an end elevation of the holder shown in FIG. 8;

FIG. 10b is a side elevation showing details of the tool driver of FIG. 8;

FIG. 10c is an end elevation of the driver shown in FIGS. 10a and 10b with the drill bit inserted in unlocked position;

FIG. 10d is an end elevation of the arrangement in FIG. 10c but in locked position;

FIGS. 11a and 11b are respectively an end elevation of a five-flute, straight fluted reamer mounted in a driver in unlocked and locked positions;

Figure 12:
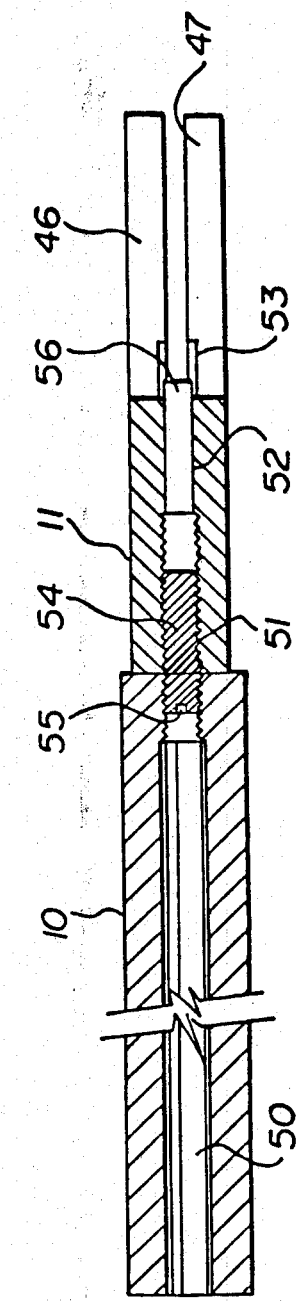
FIG. 12 is a sectional view of a tool driver according to FIG. 8 with an abutment adjustment.

Looking now at the drawings in detail, 10 represents a typical shank member which may be straight, tapered, etc. as used in typical drill presses, milling machines, etc. This shank 10 includes at one end thereof a cylindrical portion 11 with longitudinally projecting spline members 12. Projecting from the ends of these spline members 12 are short end tips 13. The splines 12 have curvilinear outer faces 21 preferably of the same curvature as cylindrical member 11. The outer faces 23 of end tips 13 are also curvilinear in shape and are radially inwardly offset from the faces 21, with an end face portion 22 extending between outer face 21 and inner face 23. The tips 13 terminate in end faces 24 and the splines 12 and tips 13 have a common inner face 25 which has radial side faces merging into a convex inner face as shown in FIG. 3.

A tubular member 14 fits snugly but rotatably over the cylindrical member 11 and splines 12. The tubular member 14 has at the outer end thereof inwardly projecting tabs 15 which are adjacent the end tips 13, with the inner edges of tabs 15 moving in close proximity to the curved tip faces 23 as shown in FIG. 2. The sleeve 14 has a slot 18 which corresponds longitudinally in position to a hole 17 extending through the cylindrical member 11. A pin 16 extends into hole 17 whereby the amount of rotation of sleeve 15 is limited by the length of the slot 18.

A straight flute reamer 19 is shown fitting into the driver. This cutting tool is of a generally cylindrical configuration and has three straight flutes 37 symmetrically disposed about and extending the entire length of the body, defining peripheral lands 20 therebetween. The ends of the tool have camfers 28 and each land 20 has a central recess or notch 29. The bottom faces 30 of these notches 29 are of the same diameter as the outer faces 23 of end tips 13 and are longitudinally aligned with these tips 13 so that the tabs 15 of sleeve 14 can turn into and out of engagement with the notches 29. When installed into the driver, the inner end of the cutting tool abuts against the inner end face 26 of the holder. This end face then carries the full axial load of the cutting tool in operation and none of this load need be carried by the tabs 15. The tabs 15, in the operating position, merely serve to prevent the cutting tool 19 from being disengaged from the driver.

The slot 18 in sleeve 14 is so positioned and is of such length that when turned to one extremity, the tabs 15 are positioned between the notches 29 as shown in FIG. 3b, while at the other extremity, the tabs 15 are in engagement with the notches 29 as shown in FIG. 3c. If desired, a spring loaded locking mechanism may be utilized to generally bias the sleeve 14 in the tool locked position of FIG. 3 such that the sleeve 14 can be removed from that position only by way of a brisk manual rotation thereof. This prevents the mechanism from accidentally unlocking.

FIGS. 5, 6 and 7 illustrate how the same tool driver as shown in FIGS. 1 and 2 can be utilized without any form of adjustment to retain cutting tools of different cutting diameters. FIGS. 5a, 6a and 7a show a large reamer 31, a medium size reamer 32 and a small reamer 33, respectively, but the bottoms 30 of the notches or recesses 29 of each of these reamers is of identical diameter, that being that diameter of the outer faces 23 of end tips 13. FIGS. 5b, 6b and 7b show the reamers in position in the driver in unlocked position and it will be seen from FIG. 5b that for the largest reamer the outer faces of the lands 20 just clear the inner face of sleeve 14, while in FIG. 6b the outer faces of the lands 20 extend inwardly some distance 34 from the inner face of sleeve 14 and in FIG. 7b the outer faces of lands 20 extend inwardly an even greater distance 35 from sleeve 14. Notwithstanding these differences, all different sizes are held equally well by the driver because the root portions 27 of the different reamers 19 are all of identical dimensions which smoothly mate with the curving inner faces 25 of the splines 12 and tips 13. Thus, the full torque load on the cutters is carried by the contact between the inner faces of splines 12 and tips 13 and the flute faces 37 of the reamers 19.

While the above discussion has all related to reamers with three straight flutes, it will be appreciated that the principles discussed are equally applicable to any kind of straight flute cutting tool containing two or more flutes. Typically about 2 to 6 flutes are preferred.

Another embodiment of the invention is illustrated by FIG. 8 which shows a driver having a sleeve member 40 with a pair of inwardly projecting end tabs 41. This arrangement is designed to retain a two flute cutting tool, such as drill 42. This drill has sharpened cutting ends 43 with each land 20 having a central notch or recess 44. The bottoms 44a of these notches 44 are of the same or slightly smaller diameter than the inner edges of end tabs 41 so that the tabs 41 will mate within the notches 44 in the locked position.

The drill bit 42 has outer land faces 45 which fit within sleeve 40 and each drill has flutes 48 curved to mate with the curved inner faces 47 of splines 46. Thus, the drill bit 42 fits snugly within the splines 46 for torque transfer and the drill bits are held in position by means of the end tabs 41 which mate with the notches 44. In this embodiment, the splines 46 were made without projecting end tips radially adjacent the tabs 41 and the splines terminated a short distance before the tabs 41 as shown in FIG. 10b. An easy locking and unlocking operation was still obtained.

Thus, FIGS. 10a and 10b illustrate the driver in the open position ready to receive a bit, FIG. 10c shows the end of the holder with the bit inserted prior to locking and FIG. 10d shows the bit in place with the tabs 41 in the locked position.

FIGS. 11a and 11b show a five-flute reamer 59 within a driver having a tubular sleeve 57 with end tabs 58. FIG. 11a shows the reamer in place prior to locking and FIG. 11b shows the bit in place with the tabs 58 in the locked position.

Figure 13:
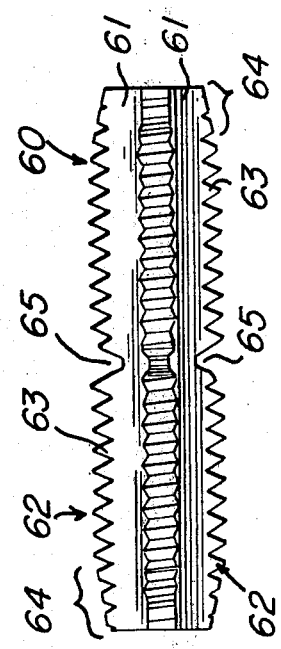
FIG. 13 is a side elevation of a straight fluted tap.

FIG. 13 is a side elevational view of a tap adapted for use in and made in accordance with the present invention. As shown, the tap 60 has a plurality of flutes 61 extending the length of the tool body defining a plurality of lands 62 having formed thereon threads 63 for forming the threads in a machined hole. The tap is similar in design to the reamer shown in FIG. 4a in that the tool is symetrical and indexable end for end in a tool driver of the type described herein. Like the reamer, notches 65 are formed in the lands at the mid-point of the tool for retaining engagement with tabs 15 as the driver or tool holder shown in FIG. 2.

While the tap illustrated in FIG. 13 is of the type called a "plug tap" having cutting threads and a moderate chamfer or taper (64) at each of the ends thereof, other forms such as bottoming or taper taps can also be used. In general, the principal cutting of the threads is performed by the thread cutters at the end portion of the tap, the remaining threads acting as followers to clean the threaded hole.

The tool driver can be adapted to retain cutting tools of varying lengths by providing an adjustable abutment. This is illustrated in FIG. 12 and it will be seen that the shank 10 contains an axial bore 50 which converts to a threaded bore 51 and finally a smaller smooth bore 52. Recesses 53 are also cut into the inner faces 47 of the splines 46. Mounted within the threaded bore 51 is a threaded member 54 having at one end a slot 55 to receive a screwdriver and a flat opposite end 56. This flat end 56 is the portion which engages the end of a cutter mounted within the splines 46 and is adjusted such that the full axial load on a cutter is always supported entirely by the abutment 56.

What is claimed is:

1. A rotary cutting tool driver comprising a shank member having a cylindrical portion projecting axially from one end thereof, said cylindrical portion having at least two spline members projecting longitudinally from the end thereof remote from the shank, said spline members having curvilinear outer faces forming extensions of said cylindrical portion and projecting inwardly to provide a central axial gap and radial gaps therebetween, and a cylindrical sleeve member rotatably mounted on said cylindrical portion and splines, said sleeve member having at the outer end thereof inwardly projecting tab members adapted to engage notches in peripheral lands of a fluted cutting tool when mounted in the driver.

2. A tool driver according to claim 1 wherein said spline members have on the outer ends thereof longitudinal projections with arcuate outer faces radially inwardly offset from said spline outer faces.

3. A tool driver according to claim 2 wherein the inward projections of said spline members have curvilinear cross-sections.

4. A tool driver according to claim 3 wherein said cylindrical sleeve member is rotatable between an open position to receive or allow for the removal of a fluted cutting tool and a closed position with the tab members engaged with notches in the lands of a fluted cutting tool.

5. A tool driver according to claim 1 having 2–6 spline members.

6. A tool driver according to claim 4 including a spring biased locking means for locking the sleeve member in closed position.

7. A rotary cutting tool comprising a driver including a shank member having a cylindrical portion projecting axially from one end thereof, said cylindrical portion having at least two spline members projecting longitudinally from the end thereof remote from the shank, said spline members having curvilinear outer faces forming extensions of said cylindrical portion, projecting inwardly to provide a central axial gap and radial gaps therebetween, and a cylindrical sleeve member rotatably mounted on said cylindrical portion and splines said sleeve member having at the outer end thereof inwardly projecting tab members and a fluted cutting bit mounted axially in said driver with the flutes drivingly engaging the splines and the inner end of said bit abutting an abutment face within said driver, said cutting bit having at least two flutes and notches in the outer faces of the lands between said flutes which notches are engageable by said tab members for holding the bit within the driver.

8. A rotary cutting tool according to claim 7 wherein said cutting bit has cutting edges at both ends and is reversible within the driver.

9. A rotary cutting tool according to claim 7 wherein said cutting bit is a drill bit.

10. A rotary cutting tool according to claim 7 wherein said cutting bit is a reamer.

11. A cutting tool according to claim 7 in the form of an end mill.

12. A rotary cutting tool according to claim 7 wherein said spline members have on the outer ends thereof longitudinal projections with arcuate outer faces radially inwardly offset from said spline outer faces.

13. A rotary cutting tool according to claim 12 wherein the inward projections of said spline members have curvilinear faces which mate with curvilinear faces of the flutes of said cutting bit.

14. A rotary cutting tool according to claim 13 wherein the cutting bit notches have arcuate bottom faces having the same diameter as the arcuate faces of the spline projections; such that the notch bottoms and spline projection faces form a substantially full circle.

15. A rotary cutting tool according to claim 14 wherein the inwardly projecting tab members have curvilinear inner faces which closely mate with the notch bottoms and spline projection faces.

16. A rotary cutting tool according to claim 15 wherein cutting bits of different cutting diameters have identical inner root portions between flutes and notch bottoms of identical diameter, whereby cutting bits of different cutting diameters are mountable within a common driver.

17. A rotary cutting tool according to claim 7 wherein the abutment face within the driver is axially adjustable for engaging the ends of cutting tools of different lengths.

18. An elongated reversible and bilaterally symmetrical fluted cutting tool adapted for forming and machining and having a generally uniform cylindrical outer configuration and diameter and having at least two generally concave flutes formed in the outer face thereof, all of said flutes being symmetrically disposed about and extending substantially the entire length of the tool body forming thereby peripheral lands between said flutes which lands extend the length of said tool to the midpoint thereof, cutting surfaces formed at predetermined portions of the junctures of said flutes and lands, and retaining notches formed in the face of said lands substantially at the midpoint thereof wherein the cutting surfaces formed in one sector of the tool defined by the midpoint thereof are diametrically reversed in the other tool sector when viewed from the perspective of said one end of the tool.

19. A cutting tool according to claim 18 wherein each retaining notch has tapered side faces.

20. A cutting tool according to claim 18 wherein each retaining notch has an arcuate bottom face.

21. A cutting tool according to claim 19 or claim 20 wherein each concave flute is shaped for receipt of and driving engagement by the convex surface of a tool driver spline member.

22. A cutting tool according to claim 18 in the form of a reamer.

23. A cutting tool according to claim 18 in the form of a drill.

24. A cutting tool according to claim 18 in the form of a thread cutting tap whereby the thread cutters formed at the juncture of the flutes and lands at each side of the notches are cut on opposite sides of said lands.

25. A rotary cutting tool driver comprising a shank member having a cylindrical portion projecting axially from one end thereof, said cylindrical portion having at least two tool driving spline members projecting longitudinally from the end thereof remote from the shank, each said spline member having a curvilinear outer face and inwardly extending side faces merging into a convex inner face, said splines providing therebetween a central axial gap and symmetrically disposed radial gaps, and a cylindrical sleeve member rotatably mounted on said cylindrical portion and splines, said sleeve member having at the outer end thereof inwardly projecting tool locking tab members, said sleeve and associated tab members being rotatable between a tool locking and a tool releasing position.

26. A tool driver according to claim 25 wherein said tab members are symmetrically disposed on said sleeve end.

27. A tool driver according to claim 26 wherein said tab members are equal in number to said spline members and overlie the outer ends of said spline members when said sleeve member is in tool releasing position.

28. A tool driver according to claim 26 wherein said tab members are equal in number to said radial gaps and overlie the outer ends of said radial gaps when said sleeve member is in tool securing position.

29. A tool driver according to claim 25 wherein the curvilinear outer faces of the spline members define extensions of the cylindrical portion.

30. A tool driver according to claim 29 wherein said spline members have on the outer ends thereof longitudinal projections with arcuate outer faces radially inwardly offset from said spline outer faces.

31. A tool driver according to claim 30 wherein said inwardly projecting tab members overlie said inwardly offset projections when said sleeve is in tool releasing position.

32. A tool driver according to claim 25 including locking means for locking the sleeve member in tool locking position.

33. A tool driver according to claim 25 wherein said splines engage the flutes of the cutting tool holding the cutting tool within the driver.

34. A tool driver according to claim 25 wherein the convex inner faces of said splines are shaped to locate and conformably engage the flutes of the fluted cutting tool when assembled therewith.

35. A tool driver according to claim 25 wherein said tabs in tool releasing position are axially aligned with said spline members, and in tool securing position are aligned with said radial gaps.

36. A rotary cutting tool driver for a removable cutting tool of generally cylindrical outer configuration and having concave flutes formed in the outer face thereof and land areas therebetween, said land areas including intermediate recesses for retaining said tool within said holder, said driver comprising a shank member having a cylindrical portion projecting axially from one end thereof, said cylindrical portion having at least two tool securing and driving spline members projecting longitudinally from the end thereof remote from the shank, each said spline member having an arcuate outer face conforming to an extension of said cylindrical portion and radially inwardly extending side faces merging into a convex inner face, said side and inner faces forming generally concave shaped gaps between said splines for conformably receiving said concave flutes and drivingly engaging said cutting tool, and a tubular sleeve member rotatably mounted over said cylindrical portion and splines and having radially inwardly projecting tab members, said sleeve member being rotatable between a tool retaining position wherein said tab members engage said recesses to secure said cutting tool within said tool driver and a tool releasing position wherein said tab members overlie said flutes allowing for removal or insertion of said cutting tool.

37. A rotary cutting device comprising in combination:
(a) a driver and holder including a shank member having a cylindrical portion projecting axially from one end thereof, said cylindrical portion having at least two spline members projecting longitudinally from the end thereof remote from the shank, each said spline member having an arcuate outer face and radially inwardly extending side faces merging into a convex inner face, said splines providing therebetween a central axial gap and symmetrically disposed radial gaps, and a cylindrical sleeve member rotatably mounted on said cylindrical portion and splines, said sleeve member having at the outer end thereof inwardly projecting tab members, said sleeve and associated tab members being positionable between a tool securing and a tool releasing position; and (b) a fluted cutting tool mounted axially in said driver with the flutes conformably engaging said spline convex inner faces and the inner end of said bit abutting an abutment face within said driver, said cutting tool having at least two said flutes formed in the outer face thereof defining peripheral lands therebetween and notches in said lands engageable by said tab members in tool securing position.

38. A rotary cutting device according to claim 37 wherein the cutting tool is a symmetrical, reversible straight fluted cutting tool.

39. A rotary cutting device according to claim 37 wherein the driver has an axially adjustable abutment face for engaging the ends of cutting tools of different lengths.

40. A rotary cutting device according to claim 37 wherein said tabs in tool releasing position are axially aligned with said spline member and in tool securing position are axially aligned with said radial gaps.

41. A rotary cutting device according to claim 37 wherein said spline members have on the outer ends thereof longitudinal projections with arcuate outer faces radially inwardly offset from said spline outer faces.

42. A rotary cutting device according to claim 37 including locking means for locking said sleeve member in tool securing position.

43. A rotary tool driver for a cutting tool of generally cylindrical outer configuration with at least two flutes formed in its outer surface and peripheral lands therebetween, at least one of said lands having a tool retaining notch formed therein, said tool driver comprising:

a cylindrical member;

a plurality of spline members extending from one end of said cylindrical member, each spline member extending inwardly a limited distance to an inner face conforming in shape to the shape of said flutes of said cutting tool, said spline members conformably and drivingly engaging said cutting tool flutes when said cutting tool is inserted into said driver; and a tubular sleeve member rotatably mounted over said splines, having at least one inwardly projecting tab member and being rotatable between a tool retaining position wherein said tab member engages said notch when said cutting tool is inserted into said driver and a tool releasing position wherein said tab member overlies one of said flute to allow for removal and insertion of said cutting tool.

44. A tool driver according to claim 43 wherein the inner faces of said spline members are convex.

45. A tool driver according to claim 43 wherein said sleeve member has a plurality of tab members corresponding in number to the number of cutting tool lands and each of said lands includes corresponding cutting tool retaining notches formed therein.

* * * * *